(12) United States Patent
Deshayes

(10) Patent No.: US 10,614,983 B2
(45) Date of Patent: Apr. 7, 2020

(54) SWITCHING ELEMENT FOR ELECTRICAL ENERGY DISTRIBUTION BOARD AND ELECTRICAL ENERGY DISTRIBUTION BOX FITTED WITH SUCH A SWITCHING ELEMENT

(71) Applicant: Zodiac Aero Electric, Montreuil (FR)

(72) Inventor: Olivier Deshayes, Toulouse (FR)

(73) Assignee: Zodiac Aero Electric, Montreuil (FR)

( * ) Notice: Subject to any disclaimer, the term of this patent is extended or adjusted under 35 U.S.C. 154(b) by 0 days.

(21) Appl. No.: 15/754,243

(22) PCT Filed: Aug. 24, 2016

(86) PCT No.: PCT/EP2016/070009
§ 371 (c)(1),
(2) Date: Feb. 21, 2018

(87) PCT Pub. No.: WO2017/032814
PCT Pub. Date: Mar. 2, 2017

(65) Prior Publication Data
US 2018/0286615 A1    Oct. 4, 2018

(30) Foreign Application Priority Data
Aug. 24, 2015   (FR) ...................... 15 57879

(51) Int. Cl.
*H01H 50/54*   (2006.01)
*H01H 50/04*   (2006.01)
(Continued)

(52) U.S. Cl.
CPC .......... *H01H 50/54* (2013.01); *H01H 50/047* (2013.01); *H02B 1/044* (2013.01); *H01H 1/5805* (2013.01); *H01H 50/04* (2013.01)

(58) Field of Classification Search
CPC .... H01H 1/5805; H01H 50/04; H01H 50/041; H01H 50/042; H01H 50/047; H01H 50/048; H01H 50/54; H02B 1/044
(Continued)

(56) References Cited

U.S. PATENT DOCUMENTS 3,394,327 A    7/1968  William
4,368,443 A *  1/1983  Koshman ............... H01H 67/22
                                                         335/118
(Continued)

FOREIGN PATENT DOCUMENTS

EP    2 131 463 A2    12/2009
EP    2 680 289 A1     1/2014
FR    2 982 712 A1     5/2013

OTHER PUBLICATIONS

International Search Report with Translation and Written Opinion dated Sep. 30, 2016 for International Application No. PCT/EP2016/070009, filed Aug. 24, 2016, 13 pages.

*Primary Examiner* — Jacob R Crum
(74) *Attorney, Agent, or Firm* — Christensen O'Connor Johnson Kindness PLLC

(57) ABSTRACT

This switching element for an electrical energy distribution board comprises a distribution bar and a support plate on which the distribution bar is fixed. The switching element comprises a coil, a contact movable under the action of the coil, said contact being mounted movably in a chamber. Said chamber comprises two parts intended to be mounted on the distribution board (P) in such a way that the movable contact acts on said bar, said chamber being furnished with means of fixing to the distribution bar or to the plate, the switching element being non-removably fixed by said chamber onto the distribution board (P).

11 Claims, 3 Drawing Sheets

(51) Int. Cl.
*H02B 1/044* (2006.01)
*H01H 1/58* (2006.01)

(58) Field of Classification Search
USPC .......................................................... 361/631
See application file for complete search history.

(56) References Cited

U.S. PATENT DOCUMENTS

| | | | | |
|---|---|---|---|---|
| 5,552,964 | A * | 9/1996 | Naito | H01H 1/5805 |
| | | | | 200/16 A |
| 2003/0109170 | A1* | 6/2003 | Ashiya | H01H 1/5805 |
| | | | | 439/474 |
| 2003/0231482 | A1* | 12/2003 | Naimi | B60R 16/0238 |
| | | | | 361/833 |
| 2012/0319806 | A1 | 12/2012 | Mills et al. | |
| 2013/0135792 | A1 | 5/2013 | Deshayes | |
| 2013/0342968 | A1* | 12/2013 | Peterson | H05K 7/1457 |
| | | | | 361/622 |
| 2014/0002092 | A1* | 1/2014 | Kodama | H01H 1/0015 |
| | | | | 324/418 |
| 2015/0213984 | A1* | 7/2015 | Naka | H01H 50/04 |
| | | | | 335/196 |
| 2015/0371748 | A1* | 12/2015 | Kim | H01F 7/18 |
| | | | | 361/190 |
| 2016/0329690 | A1 | 11/2016 | Deshayes | |

\* cited by examiner

SWITCHING ELEMENT FOR ELECTRICAL ENERGY DISTRIBUTION BOARD AND ELECTRICAL ENERGY DISTRIBUTION BOX FITTED WITH SUCH A SWITCHING ELEMENT

CROSS-REFERENCE TO RELATED APPLICATIONS

The present disclosure is a 371 application of International Application No. PCT/EP2016/070009, filed Aug. 24, 2016, the content of which is incorporated herein by reference in its entirety.

FIELD OF THE TECHNOLOGY

The invention generally relates to electrical energy distribution boxes and, more particularly, to a switching element for such an electrical energy distribution box, in particular for an aircraft.

BACKGROUND

An aircraft generally has a supply electrical system comprising, in particular, an electrical energy primary distribution circuit. This primary distribution circuit makes it possible to protect and distribute the electrical power coming from internal sources, for example generators or batteries, or from external sources to service loads or to other distribution boxes of the aircraft.

A primary distribution circuit generally includes a power part and a control part.

The power part uses distribution boxes which generally include a distribution board comprising one or more distributing bars mounted at the surface on a support plate and distributing the power supplied by electric generators. Distribution components, such as switching elements, are mounted on the distribution board and, depending on the open or closed state thereof, allow or deny the passage of power in the distributing bars on which they are mounted or make it possible to switch the received electrical energy to another distributing bar or to another electrical energy distribution box.

FIG. 1 shows an example of an electrical energy distribution box structure for an aircraft according to the prior art.

As can be seen, an electrical energy distribution box mainly includes a distribution board P comprising one or more electrically conductive distributing bars 1 mounted on a support plate 2 and one or more switching elements 3. Switching power in the bars 1 depends on the open or closed state of switching elements 3.

As can be seen, the switches 3 are fitted with connection bars 4 through which they are mounted on the distribution board P by means of power fasteners 5 firstly comprising screws 6 provided on the connection bars 4 and floating nuts 7 provided on the support plate 2.

The open or closed state of the switch 3 is controlled by a signal carried by a cabling strand 8.

Internally, the switch 3 includes a coil (not shown) acting on a conductive movable contact 9 fitted with conductive contact pads 10 intended to engage corresponding pads 11 provided on the connection bars 4 in the closed position of the switching element (FIG. 2).

Such a mounting is advantageous insofar as it allows relatively large powers to be carried within the distribution boxes while allowing the switching of power thanks to the presence of the switching elements.

The presence of the connecting bars and of the power fasteners significantly increases the mass, volume and manufacturing costs of the distribution boxes of a primary distribution circuit, given the large number of boxes used for producing a supply network of an aircraft.

Since the on-board network of an aircraft is fitted with a large number of such distribution boxes, it is understood that this type of mounting has a relatively large mass, volume and manufacturing costs.

The aim of the invention is, therefore, to overcome this disadvantage.

BRIEF SUMMARY

According to a first aspect, the object of the invention is therefore a switching element for an electrical energy distribution board comprising a distributing bar and a support plate on which a distributing bar is fastened, the switching element comprising a coil and a contact movable under the action of the coil, said contact being mounted in a chamber, in particular movably mounted in said chamber.

In addition, the chamber includes two parts intended to be mounted on the distribution board such that the movable contact acts on said bar.

Said chamber is furnished with means of fastening on the distributing bar or on the plate, the switching element being non-removably fastened by said chamber on the distribution board.

Thus, by directly mounting the chamber of the switching element on the distribution board, the use of the connection bars and of the power fasteners is avoided, which makes it possible to reduce the mass, the volume and the manufacturing costs of such a mounting.

Advantageously, the chamber is furnished with means of fastening on the distributing bar or on the plate.

The switching element is advantageously a non-removable switching element fastened by said chamber on the distribution board.

In an embodiment, the coil exerts a pulling force, upon closure, on the movable contact, which acts on a face of the bar facing a support plate.

Advantageously, the second part of the chamber projects from the support plate.

In another embodiment, the coil exerts a pushing force, upon closure, on the movable contact, which acts on a face of the bar facing away from the support plate.

Advantageously, the movable contact can be moved in the second part of the chamber or in the first part of the chamber on the top of the distribution board.

Advantageously, the first part and the second part are open and are assembled, one on the other.

Advantageously, the first part is intended to be fastened on the distributing bar, the second part being fastened on the first part in a saving made in the support plate, in order to close the chamber.

Advantageously, the first part is mounted on the external face of the distributing bar and the other part is inserted between two parts of said distributing bar under the switching element.

According to another aspect, the invention relates to an electrical energy distribution box comprising a distribution board including at least one distributing bar and a support plate on which the distributing bar is mounted, and at least one switching element comprising a coil, a contact movable under the action of the coil and a chamber in which the contact is mounted, said chamber comprising two parts intended to be mounted on either side of the distribution board such that the movable contact acts on said bar.

In an embodiment, the distribution board includes a cooling device fastened on the support plate.

For example, the cooling device includes a sealed enclosure for circulating a cooling gas or fluid.

The distribution box can further include an electronic card mounted on the distributing bar and comprising conductive tracks and means for electrically connecting the card.

Advantageously, the electronic card includes an assembly of at least one component and/or voltage tap and/or temperature sensor.

BRIEF DESCRIPTION OF THE SEVERAL VIEWS OF THE DRAWINGS

Other aims, features and advantages of the invention will become apparent on reading the following description, given solely by way of non-limiting example, and with reference to the appended drawings, in which.

DETAILED DESCRIPTION

Figure 1:
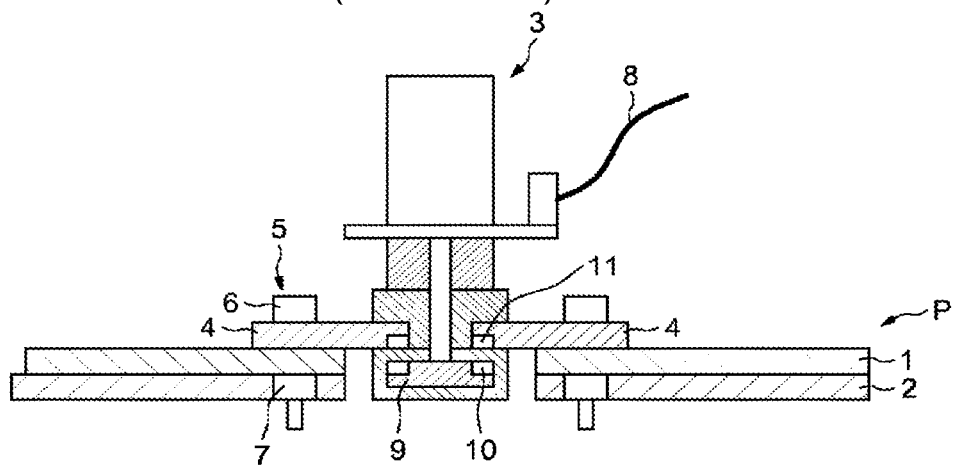
FIGS. 1 and 2, which have already been mentioned, schematically illustrate the composition of an electrical energy distribution box according to the prior art.
Figure 2:
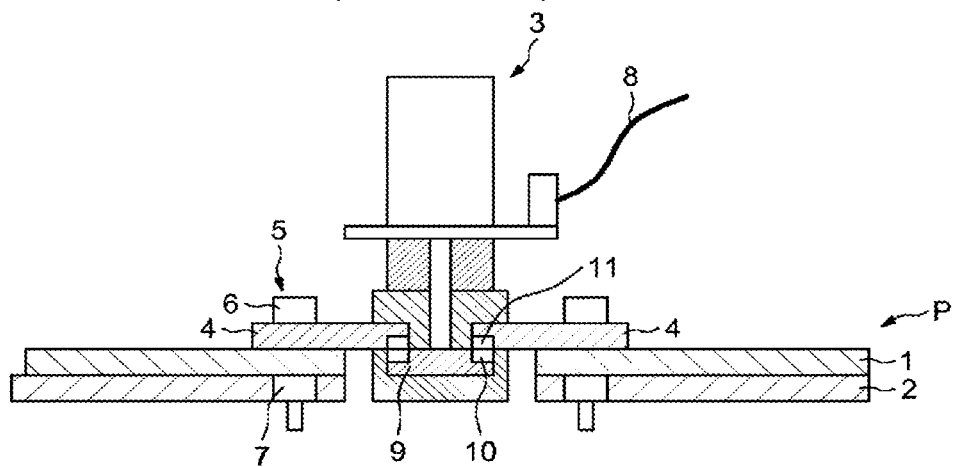
Figure 3:
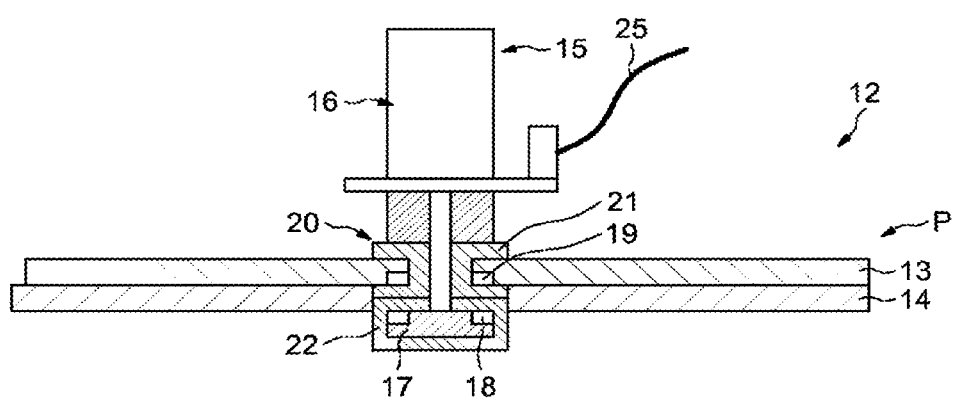
FIG. 3 illustrates the structure of an electrical energy distribution box according to the invention.

Reference will firstly be made to FIG. 3 which illustrates an exemplary embodiment of an electrical energy distribution box according to the invention, designated by the general numerical reference 12.

As in the prior art, the box 12 includes a distribution board P comprising one or more electrically conductive distributing bars 13 or bus-bar mounted on a support plate 14 made of an electrically insulating material, in this case epoxy, and, for each bar 13, a switching element 15 formed by a switch fastened on the distribution board.

The distributing bars 13 can be mounted on the support plate 14 by any suitable means, for example using rivets or by means of a conductive adhesive in order to improve the heat exchanges.

Each switching element 15 includes a coil (not shown) placed in a box 16, controlled and supplied with power by a strand 25 and a contact 17 movable under the action of the coil between an open position of the switching element, which can be seen in FIG. 3, and a closed position of the switching element.

The movable contact 17 includes, in this respect, electrically conductive contact pads 18, which are optional, intended to cooperate, in the closed position of the switching element with corresponding contact pads 19, which are also optional, provided on the distributing bars 13 opposite the pads 18 provided on the movable contact 17.

The movable contact 17 is, in this case, mounted in a chamber 20 by which the switching element 15 is mounted on the distribution board.

The chamber 20 is produced in two parts and includes a first part 21 and a second part 22 which are open and assembled, one on the other.

The first part 21 is intended to be fastened on a distributing bar 13, for example by adhesion, the second part 22 being fastened on the first part 21, in a saving made in the support plate 14, in order to close the chamber 20.

The switching element, fastened by the chamber 20 on the distributing bar, is thus a non-LRU ("non-Line Replaceable Unit") non-removable switching element making it possible to remove the traditionally used fastening captive screws.

The removal of such screws is moreover advantageous insofar as these screws form conductive elements with which conductive objects external to the distribution box can come into contact to create short circuits.

Thus, contrary to the prior art in which the switching element is fitted with connection bars which are fastened on the distribution board by means of power fastenings, the chamber 20, in which the movable contact 17 moves, is fastened on the distributing bar 13 which makes it possible to substantially reduce the manufacturing costs, the volume and the mass of the distribution box.

In the embodiment of FIG. 3, the coil 16 provides a pulling force, upon closure of the contact, on the movable contact 17 such that the conductive pads which receive the pads 18 borne by the movable contact are fastened on the face of the distributing bar 13 facing the support plate 14.

Consequently, the second part 22 of the chamber 20 projects from the support plate 14.

Figure 4:
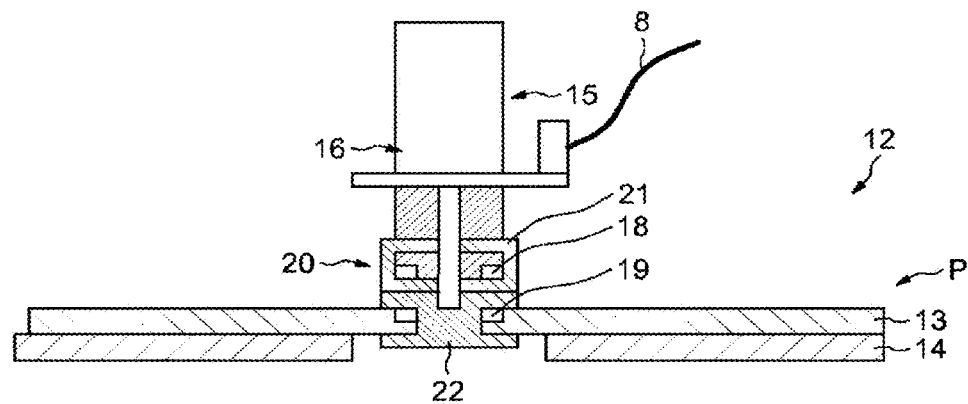
FIGS. 4 and 5 illustrate other exemplary embodiments of the box of FIG. 3.

With reference to FIG. 4, in order to further reduce the bulkiness of the distribution box on the side of the support plate 14, the coil 16 exerts a pushing force on the movable contact 17, upon closure of the contact, the pads 19 being mounted on the face of the distributing bar 13 facing away from the support plate 14.

Thus, while in the embodiment of FIG. 3, the movable contact can be moved in the second part 22 of the chamber, in the embodiment of FIG. 4, the movable contact 17 can be moved in the first part 21 of the chamber on the top of the distribution board P.

In this embodiment, the second part 22 of the chamber is fastened on the distributing bar 13. Thanks to this arrangement, the chamber 20 no longer projects from the support plate 14.

Figure 5:
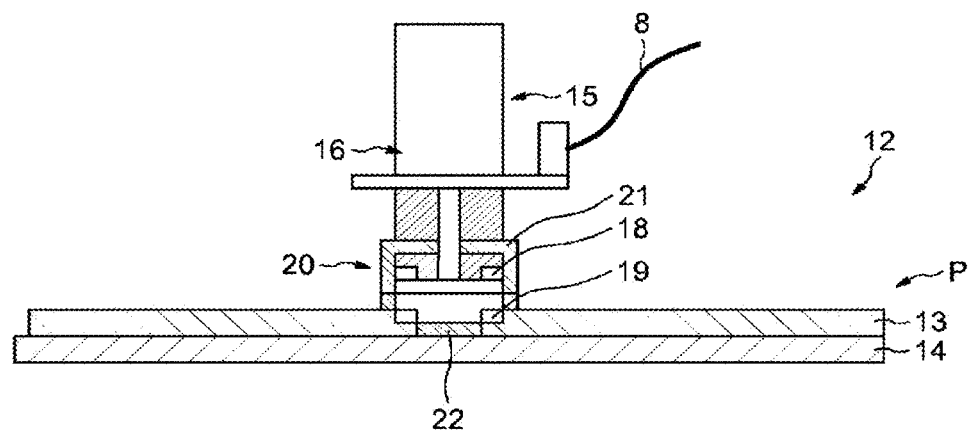

According to an alternative, which can be seen in FIG. 5, which makes it possible to facilitate assembling by making it possible to mount the two parts 21 and 22 on the same side of the distribution board P, the first part 21 is mounted on the external face of the distributing bar 13, while the other part 22 is inserted between two parts 13a and 13b of the distributing bar 13, substantially as a continuation and in the plane of the latter parts, under the switching element.

It will be noted, however, that there is no departure from the scope of the invention when the chamber 2 is mounted on the distribution board according to other arrangements. It will be noted, in this respect, that the chamber can be mounted on the distributing bar or on the plate.

Figure 6:
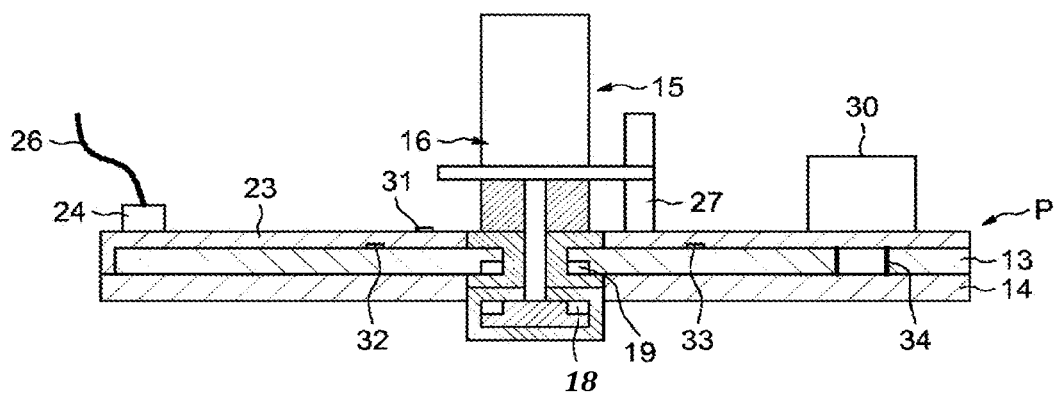
FIGS. 6 and 7 illustrate specific embodiments of an electrical energy distribution box according to the invention.

With reference to FIG. 6, in an embodiment compatible with either of the alternatives described above with reference to FIGS. 3 and 4, the distribution box can be fitted with a routed electronic card 23 covering the conductive bar 13. The electronic card 23 includes conductive tracks (not shown) making it possible, for example, to connect the switching element 15 to one or more connectors 24 connected to the outside of the board by one or more cables 26.

In this embodiment, the strand 25 which supplied power to the coil in the embodiment of FIG. 3 may be omitted, wherein the control of and the supply-of-power to the coil can be, in this case, achieved by the card, from a supply connector 24 which communicates with a control and supply pin 27 for the coil mounted on the card.

The open or closed state of the switching element 15 is also copied at a connector 24 and can be supplied by means of a cable 26 to an external electronic circuit.

The routed electronic card 23 also allows the surface-routing of a number of components 30. These can be, for example, opto-coupling components, transistors, diodes, or components for modulating the current flowing in the coil.

The routed electronic card 23 also makes it possible to integrate, in the distribution board P, a set of sensors or voltage taps connected by tracks of the card to a connector 24 in order to deliver information to the external electronic circuit relating to the operation of the distribution box.

For example, these can be temperature sensors 31 provided at the surface on the card 23, or voltage taps 32 and 33 provided on the face of the card 23 in contact with the bar 13, on either side of the switching element. A hole 34 can further be provided between the card 23 and the plate 14, below each component.

Figure 7:
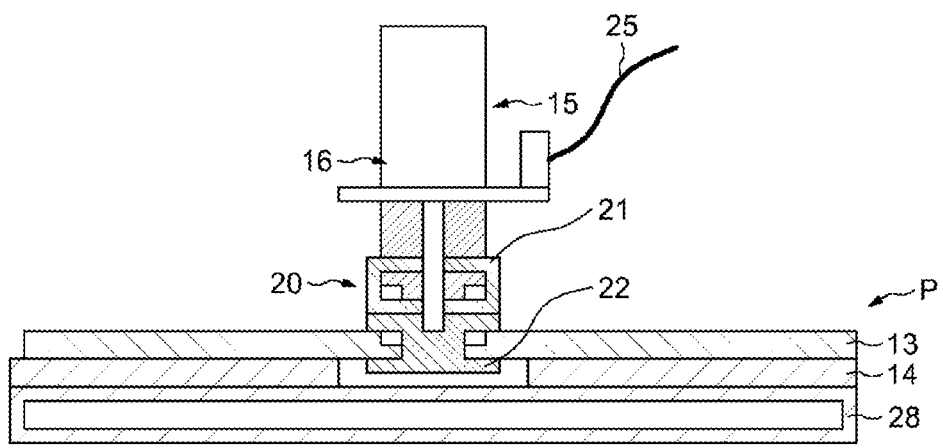

Referring finally to FIG. 7, in an embodiment that is particularly compatible with the embodiment described with reference to FIG. 4, the distribution box can be fitted with a cooling device 28 fastened on the support plate 14.

In the illustrated exemplary embodiment, the cooling device 28 includes a sealed enclosure, for example made of aluminum, in which a cooling gas or liquid flows, for example water or glycol, or a mixture of water and glycol. Such an enclosure can be placed on either side of the support plate.

It will be noted that the enclosure can be provided such as to extend opposite the chamber 22, as shown, or to be interrupted at the location of the chamber.

It would also be possible, in an alternative, to produce such a cooling device in the form of a gilled radiator on the plate or by producing the distributing bars in the form of a hollow structure allowing the flow of a cooling gas or fluid.

The invention claimed is:

1. A switching element for an electrical energy distribution board comprising a distributing bar and a support plate on which the distributing bar is fastened, the switching element comprising a coil and a contact that is movable under the action of the coil, said contact being movably mounted in a chamber, characterized in that said chamber includes two parts configured for mounting on the distribution board (P) such that the movable contact acts on said distributing bar, said chamber including means of fastening on the distributing bar or on the support plate, the switching element being a non-removable switching element fastened by said chamber on the distribution board (P), wherein the coil exerts a pulling force, upon closure, on the movable contact which acts on a face of the distributing bar facing the support plate.

2. The switching element as claimed in claim 1, wherein the two parts comprise a first part and a second part, and the first part and the second part are open and are assembled, one on the other.

3. The switching element as claimed in claim 1, wherein the two parts comprise a first part and a second part, and the first part is configured to be fastened on the distributing bar, the second part being fastened on the first part in a saving made in the support plate, in order to close the chamber.

4. The switching element as claimed in claim 1, wherein the two parts comprise a first part and a second part, and the first part is mounted on an external face of the distributing bar and the second part is inserted between two parts of said distributing bar under the switching element.

5. The switching element as claimed in claim 1, wherein the two parts comprise a first part and a second part, and the second part of the chamber projects from the support plate.

6. An electrical energy distribution box comprising a distribution board (P) including at least one distributing bar and a support plate on which the distributing bar is mounted, and at least one switching element as claimed in claim 1.

7. The electrical energy distribution box as claimed in claim 6, wherein the chamber includes two parts configured to be mounted on either side of the distribution board (P) such that the movable contact acts on said distributing bar.

8. The electrical energy distribution box as claimed in claim 6, wherein the distribution board includes a cooling device fastened on the support plate.

9. The electrical energy distribution box as claimed in claim 8, wherein the cooling device includes a sealed enclosure for circulating a cooling gas or fluid.

10. The electrical energy distribution box as claimed in claim 6, comprising an electronic card mounted on the distributing bar and comprising conductive tracks for electrically connecting the electronic card to the switching element and to electronic circuits of the distributing bar.

11. The electrical energy distribution box as claimed in claim 10, wherein the electronic card includes an assembly of at least one component and/or voltage tap and/or temperature sensors.

* * * * *